United States Patent Office 3,517,414
Patented June 30, 1970

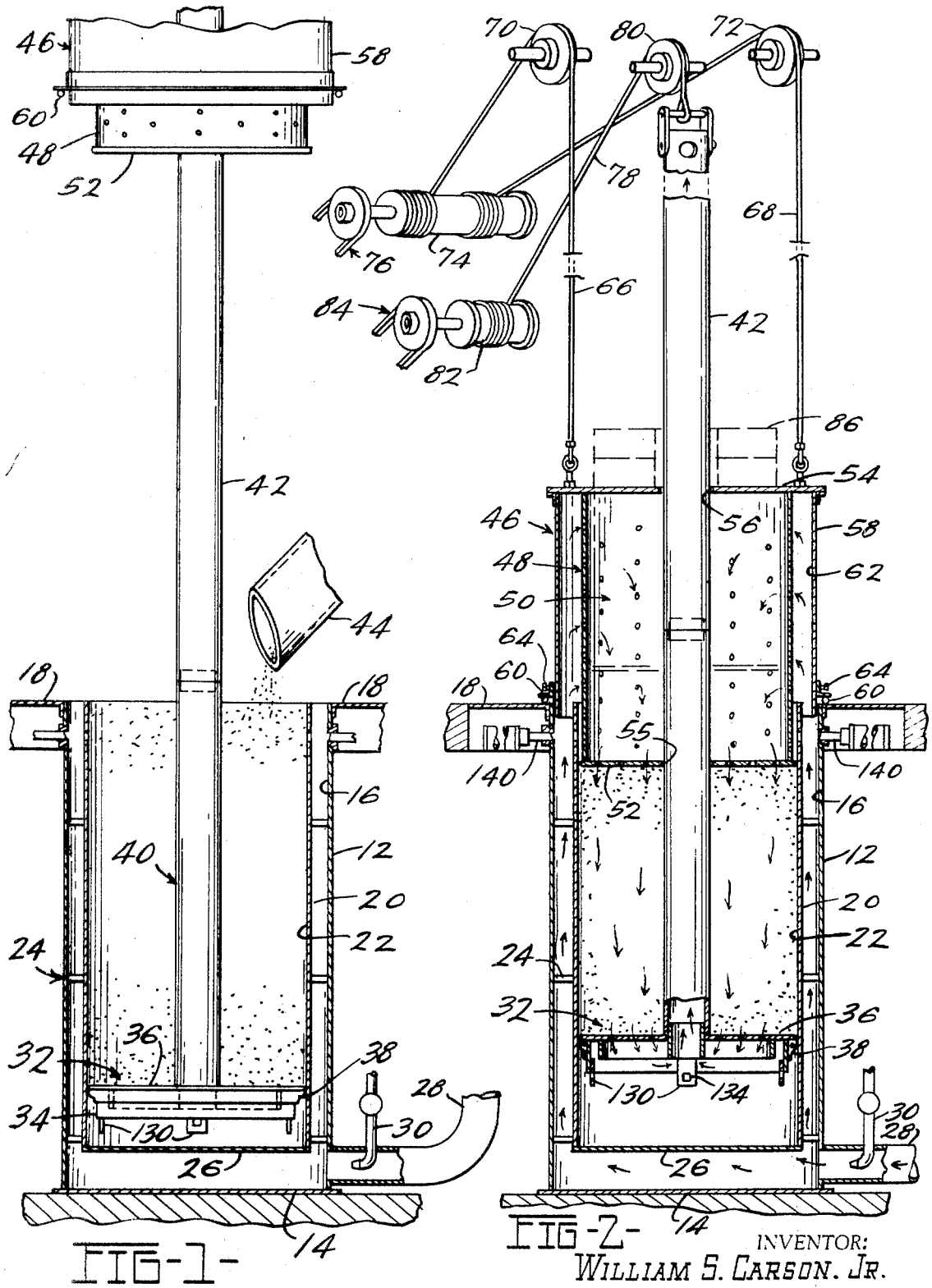

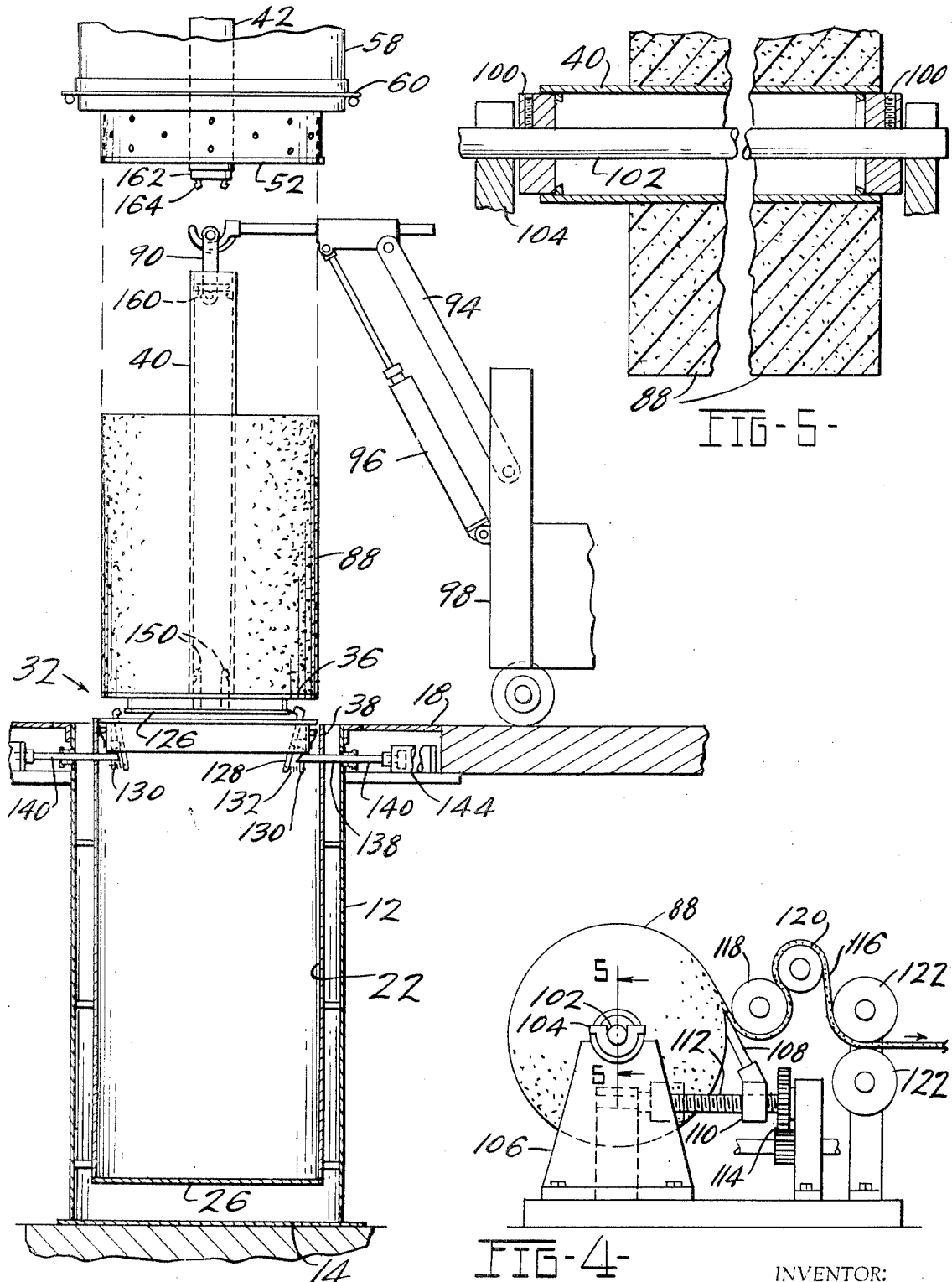

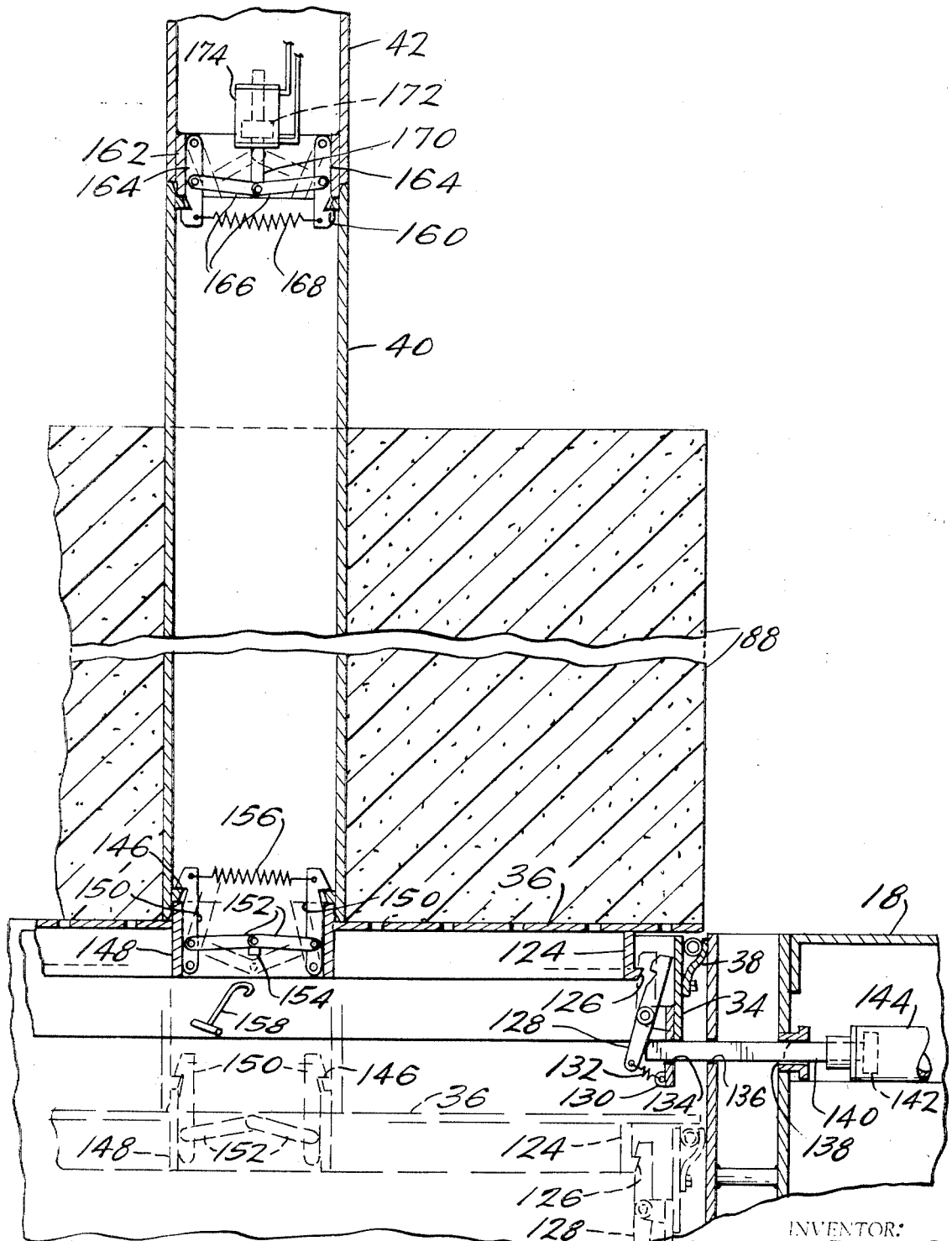
FIG-6-

3,517,414
APPARATUS FOR PROCESSING PLASTIC MATERIAL
William S. Carson, Jr., Swanton, Ohio, assignor to Scottdel, Inc., Swanton, Ohio, a corporation of Ohio
Filed Aug. 31, 1967, Ser. No. 664,772
Int. Cl. B29c 3/00
U.S. Cl. 18—16.5                   8 Claims

ABSTRACT OF THE DISCLOSURE

An apparatus for processing new or scrap foam material is provided. The foam material is cut into pieces and mixed with a resin in a cylindrical mold, and cured. After curing, the resulting cylindrical body of foam pieces and resin binder or matrix is rotated on its axis and sheets cut therefrom. The resulting sheet material is particularly useful for carpet padding, but has other uses where a resilient sheet of material, particularly with insulating properties, is desired.

---

This invention relates to apparatus for processing material.

A considerable amount of scrap results from the production of cushions, packaging material, etc. made of plastic or other resilient foam materials. Heretofore, such scrap has found relatively little use and consequently has had relatively little value.

The present invention provides apparatus by means of which such material can be made into products having substantially wider applications. The scrap foam material can be cut into small pellets or pieces, in the order of one-eighth to one-fourth inch across their maximum dimention, and mixed with a plastic foam material forming a binder or matrix for the pieces. The combined material is then placed in a mold and cured, after which the resulting body of the material can be cut to various sizes and shapes to form a variety of products. Specifically, in accordance with using the apparatus, the material is molded into a cylindrical form with the cylinder then rotated about its axis and layers or sheets cut off. The sheets can be produced in a thickness of approximately one-fourth inch to serve as effective, low-cost carpet padding.

The apparatus employed in making the reconstituted product is also of a comparatively simple, low-cost, and reliable design. It includes means forming a mold chamber with a perforated, movable bottom wall and a perforated, movable top wall through which a curing fluid such as air and steam can be directed. These walls also can be moved toward one another to compress the material within the mold and can be moved out of one end of the mold to remove the product therefrom. The end walls can then be seprated from the product, leaving a tube extending therethrough which can be rotated to rotate the product and enable the sheets to be cut therefrom. The tube also can serve as a vent for the curing fluid.

It is, therefore, a principal object of the invention to provide apparatus for processing or reconstituting new or scrap foam material having the features and advantages outline above.

Numerous other objects and advantages will be apparent from the following detailed description of a preferred embodiment thereof, reference being made to the accompanying drawings in which:

FIG. 1 is a somewhat schematic, fragmentary view, with components in vertical cross section, of apparatus according to the invention and showing materials being loaded into a mold;

FIG. 2 is a somewhat schematic view in vertical section of the complete molding apparatus, with material being comperssed and cured in the mold;

FIG. 3 is a view similar to FIG. 2 but with the material cured and raised to a floor-level position just above the mold;

FIG. 4 is an end view in elevation of the cylinder of the processed or reconstituted material mounted for rotation with apparatus for removing sheets of the material from the cylinder;

FIG. 5 is a fragmentary view taken along the line 5—5 of FIG. 4; and

FIG. 6 is a greatly enlarged fragmentary view in vertical cross section showing details of certain latch connections for the components of FIG. 1–3.

Referring to FIG. 1, a cylindrical wall 12 and a bottom wall 14 form a receiving chamber 16 preferably located below the level of a floor 18. A cylindrical mold 20 forms a mold chamber 22 within the receiving chamber 16 with the mold 20 being supported in the chamber 16 and spaced from the wall 12 by suitable spacer supports 24. The mold chamber 22 is also defined by a bottom wall 26 with the annular space between the walls 12 and 20 and the lower space between the bottom walls 14 and 26 forming a plenum chamber to receive air and steam for curing purposes through pipes 28 and 30, respectively. A movable mold bottom indicated at 32 includes a supporting frame 34 and a perforate bottom platen or wall 36 carried thereon; the frame 34 has a seal 38 bearing against the inner surface of the mold wall 20. The mold bottom 32 is detachably connected to a core tube or shaft 40 which extends upwardly preferably beyond the upper end of the mold chamber 22. At this point, the tube 40 is detachably connected to a tube extension 42.

A mixture of resilient foam pieces or particles, preferably in the order of one-eighth to one-fourth inch across their maximum dimension, is mixed with a matrix or binder of an adhesive-like material, such as a resin. The mold cavity 22 is then filled with this material from a suitable supply source indicated at 44.

When the mold cavity 22 is filled to the desired level, a mold cover 46 is lowered into place, as shown in FIG. 2. The mold cover 46 includes a perforated cylindrical wall 48 forming a fluid supply chamber 50, along with a perforated platen 52 forming the upper end wall of the mold cavity 22. A solid top plate 54 forms the upper extremity of the chamber 50. The end platen 52 has an opening 55 therein aligned with an opening 56 in the top plate 54 to receive the core extension 42 upon which the cover 46 is guided. An outer cylindrical depending wall 58 extends downwardly from the periphery of the top plate 54 and is slightly smaller in diameter than the outer wall 12 so as to nest therewith until an annular seal 60 of the wall 58 contacts the upper edge of the wall 12 adjacent the floor 18. The perforated wall 48 is spaced from the outer wall 58 to form an annular chamber or passage 62 which constitutes an extension of the chamber or passage 16. If desired, the seal 60 can be mounted for longitudinal movement on the wall 58, as by means of sets screws 64. The extent to which the platen 52 extends into the mold can thus be controlled.

With the cover 46 in place, when fluid is supplied from the pipe 28 or 30, it flows into the bottom space of the chamber 16 and upwardly around the mold 20 into the annular cover passage 62 from which it flows through the perforate wall 48 and into the supply chamber 50. The fluid then moves downwardly through the perforated platen 52 and through the combined material being cured in the mold chamber 22. Since this material is lightweight and porous with interconnected cells, the fluid can move downwardly therethrough and out the perforated bottom platen 36. The heated fluid passing upwardly through the outer passage 16 also helps to heat the mold 20 and aid in the curing of the material. The fluid is then vented upwardly through the core tube 40 and the core tube extension 42 and out the top thereof.

The cover 46 and the mold bottom 32 can be raised and lowered in any suitable manner. As shown, the cover 46 is connected to a pair of cables 66 and 68 which extend over pulleys 70 and 72 to a hoist drum 74 which can be driven in any suitable manner as by a motor (not shown) connected to a belt and pulley arrangement indicated at 76. Similarly, the core tube extension 42, the core tube 40, and the bottom 32 can be raised and lowered in any suitable manner. As shown, a cable 78 is connected to the upper end of the extension 42 and extends over a pulley 80 to a hoist drum 82 which again can be driven through a suitable belt and pulley arrangement indicated at 48.

As the foam material is cured in the mold cavity 22, it preferably is compressed somewhat therein and maintained under compression. For this purpose, the cover 46 constitutes an upper compressive force against the top of the material and the mold bottom 32 can be urged upwardly by the cable 78 and the drum 82 to form a compressive force against the bottom of the material. The compressive force ordinarily cannot exceed the weight of the cover 46 but the force and the pressure on the material can be increased by adding weights 86 on top of the cover plate 54. The bottom 32 can be raised by the cable 78 to maintain the material under compression with the compressive force being a maximum when the cover 46 tends to be raised due to the upward pressure exerted by the platen 36 through the material on the perforate end platen 52.

After air and steam are passed through the foam pieces and matrix or binder material for a predetermined period of time, the steam can be shut off and the air continued to dry the material, the air preferably being heated. The curing time will depend on such factors as the type of adhesive-like material used with the foam pieces, the relative amounts of the foam pieces and the binder or matrix material, and the size of the body and the mold. After the matrix or binder has cured to a desired self-sustaining state, a resulting cylindrical body 88 in FIG. 3 is removed from the mold. To achieve this, the tube extension 42 is separated from the tube 40 and a connecting loop 90 is assembled with the top of the tube 40 after the cover 46 has been raised. The combination of the frame 34 and the platen 36, the tube 40, and the body 88 is then raised vertically from the mold chamber 22 by any suitable means. As shown, this is accomplished by a hook member 92 engageable with the loop 90 and connected to a supporting link 94 operated by a hydraulic arm 96, constituting part of an industrial truck 98. The combination is raised until the platen 36 is level with the floor 18. At this time, the platen 36 is separated from the frame 34, as will be discussed in detail subsequently, and the platen 36, the tube 40, and the body 88 can be moved to a remote location. The combination is then positioned generally horizontally and the platen 36 is separated from the tube 40 to leave only the body 88 on the tube 40. At this time, the tube and body are mounted for rotation to enable sheets to be cut from the body.

As shown in FIGS. 4 and 5, blocks 100 can be placed in the ends of the tube 40 with an axle 102 extended through the blocks and the tube, as shown in FIG. 5. The axle 102 is then rotatably supported on bearing blocks 104 of supports 106 and rotated in a clockwise direction, as shown in FIG. 4, by a suitable gear and motor arrangement (not shown) at the opposite end of the body 88. To cut and remove the material from the cylindrical body 88, a large knife blade 108 extends the length of the body 88 and is mounted on threaded blocks 110 supported on feed screws 112 which feed the knife toward the axle 102 at a predetermined rate, by means of a gear train 114, to enable a sheet 116 of predetermined thickness to be cut continually from the cylindrical body 88. The sheet 116 can be removed by suitable idler rolls 118 and 120 and by feed rolls 122. The sheet 116 can be made in the order of one-fourth inch thick, being in widths as wide as the cylindrical body 88 with the length thereof depending upon the diameter of the body 88. This material is effective carpet padding but can be used for other purposes where a resilient, insulating sheet-like material is desired or required. If the body 88 shrinks excessively from the tube 40 after curing, an expandable mandrel can be substituted.

Referring to FIG. 6, the details of the various latch mechanisms will now be discussed, the first being the one connecting the platen 36 and the frame 34. The perforate platen 36 has an annular depending flange 124 with an annular ridge or catch 126. Two or more latch levers 128 are pivotally connected to supporting plates 130 affixed to the frame 34. The frame 34 is normally connected to the platen 36 by the latch levers 128 which are urged into engagement with the ridge 126 by springs 132. However, when the platen 36 is brought to floor level and openings 134 in the plates 130 are aligned with openings 136 and 138 in the mold wall 20 and the outer wall 12, actuating rods 140 can be extended through the openings 134 to engage the latch levers 128 and release them from the flange ridge 126. The rods 140 can be connected to pistons 142 in fluid-operated cylinders 144 which can be operated manually or automatically. When the rods 140 release the levers 128, the platen 36 can then be separated along with the tube 40 and the body 88, as previously discussed, with the frame 34 held in position by the rods 140. This enables the platen 36 to be removed without carrying the frame 34 which constitutes a substantial amount of weight and also carries the seal 38 which would be subject to possible damage during handling of the body 88.

The connection between the tube 40 and the platen 36 includes an inwardly-extending catch or ridge 146 at the lower portion of the tube 40 with the platen 36 having a central annular supporting cylinder 148 carrying latch levers 150. These are pivotally connected to the supporting cylinder 148 at their lower ends and are connected at intermediate portions by over-center links 152. With the links 152 in the above-center position, as shown in solid lines in FIG. 6, the latch levers 150 are engaged with the ridge 146. The links stay in this position because a stop 154 prevents further upward movement of them, while a spring 156 connected between upper portions of the levers 150 urges the links 152 upwardly. This condition remains until it is desired to remove the platen 36 from the tube 40, at which time the components are placed in a horizontal position and a release hook 158 is inserted by an operator into the end of the tube 40 to pull the links to a below-center position, as shown in dotted lines. This releases the latch levers 150 from the ridge 146 and thereby enables the platen 36 to be removed prior to the cutting operation on the body 88.

The connection between the tube 40 and the tube extension 42 will now be discussed. The tube 40 includes an inwardly directed annular ridge or catch 160 similar to the ridge 146 and the tube extension 42 has a supporting wall 162 carrying latch levers 164. These are connected by links 166 with the outer ends urged toward one another by a spring 168. In this instance, the links 166 are moved from a below-center position, as shown in solid lines in FIG. 6, to an above-center position, as shown in dotted lines in FIG. 6, by a piston rod 170 connected to a piston 172 in a fluid-operated cylinder 174. Fluid can be supplied to the cylinder by flexable lines extending upwardly through the tube extension 42. The links 166 are operated to retract the latch levers 164 and separate them from the rdige 160 after the cover 46 has been removed and the body has been raised from the mold cavity with the platen 36 and the frame 34 at floor level and supported by the rods 140.

After the tube extension 42 is removed, the loop 90 is inserted in the top of the tube 40 and engaged with the ridge 160, as shown in FIG. 3. The loop 90 can have a latch lever arrangement similar to that associated with the center of the platen 36 or can have suitable dogs engageable with the ridge 160 if the ridge is not continuous around the entire periphery of the tube extension, in which instance the loop 90 would be placed in the tube with the dogs between the ridges 160 and turned ninety degrees to engage the dogs and the ridges.

From the above, it will be seen that the invention provides a unique apparatus for processing or reconstituting foam scrap or new material which apparatus is relatively simple, inexpensive, and reliable. Particularly if the body made in the mold is not to be rotated and cut into layers or sheets, the mold cavity need not be cylindrical. Also, many other means can be employed to place a compressive force on the material in the mold, e.g., by employing pneumatic cylinders or screw jacks at each end of the mold. Of course, the mold apparatus need not be placed below floor level either but can be mounted on the floor and pivoted to a horizontal position to facitate unloading the cured material from the mold, for example.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. Apparatus for processing a plurality of pieces of material, which pieces are mixed with an adhesive-like material, said apparatus comprising an elongate mold, a first movable end platen at one end of said mold having a shaft with a portion extending through said mold and beyond the opposite end thereof, means associated with the extending portion of said shaft beyond said opposite end of said mold to move axially said shaft to move said first platen toward and away from said opposite end of said mold, a second platen, means for moving said second platen parallel to the direction of movement of said first platen for moving said second platen into and out of said opposite end of said mold to enable said platens to be moved toward and away from one another from the same end of said mold.

2. Apparatus according to claim 1 characterized by means for detachably connecting said shaft and said first platen to facilitate said shaft being rotated on its axis to rotate the resulting molded body thereon after being cured.

3. An apparatus for compressing and curing a plurality of pieces of material mixed with an adhesive comprising an elongate cylindrical mold having a vertical axis with an upper end and a lower end, an upper and a lower platen slideably positioned within said mold and movable parallel to the axis of said mold towards each other to a closed position to compress said material therebetween, an elongate shaft secured to the upper side of said lower platen and extending upwardly with the end of said shaft terminating above the position of said upper platen when said platens are in said closed position, means operable from said upper end of said mold for removing said upper platen from said mold, and means operable from said upper end of said mold and securable to said end of said elongate shaft for removing said shaft and said lower platen from said upper end of said mold.

4. The apparatus of claim 3 wherein said elongate shaft is detachably secured to said lower platen.

5. The apparatus of claim 3 which further includes means for flowing a curing fluid through said mold.

6. The apparatus of claim 3 wherein said elongate shaft is a hollow tube extending coaxially in said cylindrical mold.

7. The apparatus of claim 3 wherein said upper and lower platens are perforate and which further includes means for flowing a curing fluid therethrough to cure said material and adhesive between said platens when in said closed position.

8. An apparatus for processing a plurality of pieces of material mixed with an adhesive comprising an elongate mold having an axis extending between one open end and the other closed end, first and second platens slideably positioned within said mold with said first platen adjacent said closed end, said platens movable along the axis of said mold towards each other to a closed position to compress such material therebetween, an elongate shaft secured to said first platen and extending towards said open end of said mold with the end of said shaft terminating beyond the position of said second platen when said platens are in said closed position, means operable from said open end of said mold for removing said second platen from said mold and means operable from said open end of said mold and securable to said end of said shaft for removing said shaft and said first platen from said open end of said mold.

References Cited

UNITED STATES PATENTS

| | | | |
|---|---|---|---|
| 2,922,710 | 1/1960 | Dombrowski et al. | |
| 3,176,348 | 4/1965 | Schmuck et al. | 18—16 |
| 3,177,553 | 4/1965 | Archibald | 18—16 X |
| 3,234,598 | 2/1966 | Tuinn | 18—16 |
| 3,266,095 | 8/1966 | Levey et al. | 18—16 |
| 3,295,167 | 1/1967 | Corbin | 18—17 |
| 3,346,914 | 10/1967 | Sandstrom et al. | 18—16.5 X |
| 3,353,214 | 11/1967 | Schulze | 18—16.5 |
| 2,158,086 | 5/1939 | Roberts et al. | 264—158 XR |
| 3,164,860 | 1/1965 | Oxel | 264—51 XR |
| 3,239,880 | 3/1966 | Oxel | 18—5 |
| 3,224,039 | 12/1965 | Kracht | 18—5 |
| 1,541,358 | 6/1925 | Johnson. | |
| 1,607,389 | 11/1926 | Claus | 18—16.5 |
| 3,132,379 | 5/1964 | Crane | 18—16.5 |

FOREIGN PATENTS 243,628   2/1963   Australia.

J. HOWARD FLINT, JR., Primary Examiner

U.S. Cl. X.R.

18—5, 16, 17; 264—321